United States Patent
Mackey et al.

(10) Patent No.: US 7,937,596 B2
(45) Date of Patent: May 3, 2011

(54) ADAPTABLE MICROCONTROLLER BASED SECURITY MONITOR

(75) Inventors: Christopher D. Mackey, Spencerport, NY (US); Mark Padrnos, North Chili, NY (US)

(73) Assignee: Harris Corporation, Melbourne, FL (US)

( * ) Notice: Subject to any disclaimer, the term of this patent is extended or adjusted under 35 U.S.C. 154(b) by 915 days.

(21) Appl. No.: 11/847,484

(22) Filed: Aug. 30, 2007

(65) Prior Publication Data

US 2009/0060194 A1  Mar. 5, 2009

(51) Int. Cl.
- G06F 11/30 (2006.01)
- G06F 12/14 (2006.01)
- G06F 1/26 (2006.01)
- G06F 1/32 (2006.01)
- H04L 9/00 (2006.01)

(52) U.S. Cl. .......................... 713/194; 713/320; 380/277

(58) Field of Classification Search .................. 713/194, 713/320; 380/277
See application file for complete search history.

(56) References Cited

U.S. PATENT DOCUMENTS

| 7,039,815 B1* | 5/2006 | Grassl et al. ............. 713/194 |
| 2006/0166709 A1* | 7/2006 | Leech .................. 455/574 |
| 2006/0225142 A1 | 10/2006 | Moon | |

FOREIGN PATENT DOCUMENTS

| EP | 0 575 854 | 12/1993 |
| WO | WO-2005009062 | 1/2005 |

* cited by examiner

*Primary Examiner* — Kambiz Zand
*Assistant Examiner* — Aubrey H Wyszynski
(74) *Attorney, Agent, or Firm* — Fox Rothschild, LLP; Robert J. Sacco

(57) ABSTRACT

A method is provided for protecting embedded cryptographic processing circuits (112, 114), software and data, contained within electronic equipment. The method involves monitoring with a first processing device (210) embedded in the electronic equipment parameter values generated by sensors (108) provided in the electronic equipment. The method also involves evaluating with the first processing device each of the parameter values to determine if it falls within a predetermined range of acceptable values. The method further involves using a modified operating profile in the first processing device to perform the monitoring or evaluating step if one or more of the parameter values is determined not to be within the predetermined range. The method also involves selecting the operating profile to include defined variables selected from the group consisting of the predetermined ranges of acceptable values, the parameter values that are evaluated, and a rate at which the parameter values are evaluated.

23 Claims, 3 Drawing Sheets

ADAPTABLE MICROCONTROLLER BASED SECURITY MONITOR

BACKGROUND OF THE INVENTION

1. Statement of the Technical Field

The invention concerns systems requiring protection from tampering and/or environmental factors that could adversely affect electrical performance. More particularly, the invention concerns cryptographic processor embedments and associated tamper protection circuits that are designed to meet customer requirements for high assurance tamper protection.

2. Description of the Related Art

In communications systems, cryptographic devices are employed to encrypt and decrypt information communicated via a physical or wireless communications link. The cryptographic device is capable of running at least one cryptographic algorithm in a protected state for generating secure data or obtaining data from an encrypted signal. The cryptographic device is typically placed between a signal generating circuit and a network interface. Similarly, decryption of information is accomplished by decrypting a signal received at a communications device utilizing a cryptographic device. The cryptographic device is typically placed between a network interface and signal processing circuits.

Such cryptographic devices may require high assurance techniques for tamper and high level security protection. In high assurance cryptographic applications, cryptographic devices can be protected from both physical and environmental tampering by a tamper protection circuit. The tamper protection circuit is comprised of discrete components configured to monitor physical and environmental security. This monitoring includes monitoring conditions occurring from a physically invasive act, such as the act of opening a casing, the act of breaking a circuit, or the act of placing covert signal monitoring pins in a circuit. Such conditions include, but are not limited to, changes in voltage, changes in temperature, and changes in ambient light.

The phrase "discrete component" as used herein refers to electronic components having a single passive or active circuit element. Such electronic components include, but are not limited to, transistors, silicon controlled rectifiers (SCRs), transorbs, diodes, capacitors, inductors and resistors. It should be noted that a "discrete component" does not include integrated circuits and hybrid circuits comprising several circuit elements. The term "physical security" as used herein refers to a hardware implementation that will monitor and/or protect against physical intrusions attempting to retrieve data stored in a cryptographic system or to compromise a cryptographic device. The term "physical security" as used herein also refers to a hardware implementation that will monitor and/or protect against environmental changes, such as low extreme temperatures. The term "environmental security" refers to a hardware implementation that will reduce a circuit's susceptibility to environmental noise, environmental vibrations, or the like.

Despite the advantages of such a tamper protection circuit, it suffers from certain drawbacks. For example, the tamper protection circuit is comprised of a relatively large number of discrete components which consume a significant amount of circuit board area and power. The discrete components can also fail in a silent manner without a real time method of detecting the failure. This can happen because such components often remain inactive until such time when an intrusion actually occurs. Accordingly, a component failure may not be apparent until the occasion when a security intrusion is attempted. Another limitation of conventional tamper protection circuits is that they are often application specific and therefore require re-engineering for each platform.

In view of the forgoing, there is a need for an improved tamper protection circuit for use in systems requiring high assurance tamper protection. The tamper protection circuit needs to be configured for use in a high assurance cryptographic application. The tamper protection circuit needs to comprise less discrete components than conventional tamper protection circuits. The tamper protection circuit needs to be relatively inexpensive to manufacture, flexible across multiple platforms, and have limited susceptibly to environmental noise. The tamper protection circuit further needs to implement an improved tamper protection technique. This improved tamper protection technique needs to provide a means for selectively monitoring any given number of conditions occurring from physically invasive acts. The improved tamper protection technique also needs to provide a means for adjusting the tamper protection circuit's operation based upon an assessment of at least one condition. The tamper protection system also needs to determine when a failure occurs in the tamper protection system.

SUMMARY OF THE INVENTION

A method is provided for protecting embedded cryptographic processing circuits, software and data, contained within electronic equipment. The method involves monitoring with a first processing device one or more parameter values generated by one or more sensors. The first processing device and the sensors are embedded in the electronic equipment, meaning that they are generally included within the circuit boards, chassis, or casing that encloses the electronic equipment. The sensors are any type of sensor that is useful for detecting a physical or environmental condition that can directly or indirectly affect the security or performance of the cryptographic processing circuits, software and data. For example, the sensors can include, without limitation, a voltage sensor, a physical intrusion sensor, a temperature sensor, a vibration sensor and/or a light sensor.

The monitoring process proceeds in accordance with a set of variables which have values that are defined in an operating profile. These variables can include the pre-determined ranges of acceptable values for parameters, the parameter values that are actually evaluated, and a rate at which the parameter values are evaluated. The first processing device evaluates each of the parameter values to determine if it falls within a respective one of a plurality of predetermined ranges of acceptable values. If a parameter value is determined not to be within the respective predetermined range, the first processing device can automatically select a modified operating profile.

For example, the modified profile can be selected to prolong an operating life of a battery. In order to reduce power consumption, the modified operating profile can provide a reduced rate at which the parameter values are evaluated by the first processing device, or a reduction in a number of the parameter values that are evaluated by the first processing device in order to reduce consumption of power provided by a battery. According to an aspect of the invention, the modified operating profile can be selected when an evaluation of the sensor parameter values in the first processing device indicate that: (a) an environmental condition is likely to cause a reduction in the battery life; and/or (b) a battery is approaching a discharged state.

The method also involves performing one or more actions to prevent unauthorized disclosure of confidential information associated with the cryptographic processing circuits, software or data. Such actions can include deleting a cryptographic key data from a memory location, halting an execution of cryptographic software, and deleting cryptographic software from a memory location. Alternatively, if a first parameter value is within the predetermined ranges of acceptable values but outside a nominal range normally expected for the parameter value, then the modified operating profile can be selected to include a more limited predetermined range of acceptable values for a second sensor parameter. In this way, the first parameter value can be used to trigger a heightened alert status with respect to the second sensor parameter.

The first processing device can be selected from the group consisting of a microprocessor, a microcontroller or a digital signal processor. Further, the monitoring and evaluating steps can be performed in a second data processing device concurrently with the monitoring and evaluating steps in the first data processing device. The second data processing device provides redundancy for the first data processing device. Also, an operational status of the first data processing device can be monitored with the second data processing device. Conversely, the method includes the step of monitoring an operational status of the second data processing device with the first data processing device. If the operational status indicates a failure of the second data processing device, then one or more actions can be performed to prevent unauthorised disclosure of confidential information associated with the cryptographic processing circuits, software or data. Significantly, when parameter values suggest the need to prolong battery life, the second data processing device can be temporarily disabled (at the expense of losing high assurance mode of operation) or its operational profile modified in a way that reduces power consumption.

Stated differently, the invention can include an adaptive method for protecting embedded cryptographic processing circuits, software and data, contained within electronic equipment. Using sensors and a first processor as described above, the method can include configuring the sensors to detect security and environmental conditions associated with a cryptographic processing circuit. Thereafter, the first processing device, which can be a microprocessor or microcontroller, can monitor two or more parameter values generated by the two or more of sensors. The first processing device can evaluate each of the parameter values to determine if it falls within a respective one of a two or more of predetermined ranges of acceptable values. Thereafter the first processing device can adaptively modify at least one of the monitoring and evaluating steps in response to at least one parameter value.

BRIEF DESCRIPTION OF THE DRAWINGS

Embodiments will be described with reference to the following drawing figures, in which like numbers represent like items throughout the figures, and in which.

DETAILED DESCRIPTION OF THE PREFERRED EMBODIMENTS

The present invention concerns a microcontroller based security monitoring system that is useful for protecting cryptographic hardware and/or software that is embedded in communications or processing equipment. The system offers several advantages over conventional security monitoring system. For example, the system can automatically respond to changing conditions by selectively varying one or more profile values that are used to evaluate the presence or absence of security threats. A similar technique can be used to respond to varying environmental conditions to prolong the life of a battery used to operate the security system. For example, in order to conserve power, data sampling rates can be reduced and/or certain data sensing/evaluation steps can be omitted.

By using two or more microcontrollers to perform the foregoing security functions, further advantages can be obtained. For example, each microcontroller can monitor at least one other microcontroller to ensure that each microcontroller is active and operational. Further, the secure data storage facilities provided in each microcontroller can be used to provide additional advantages. For example, secure data can be stored in a distributed manner among two or more such microcontrollers. Access to the memory of each such microcontroller can be locked to provide additional security. These and other advantages will become apparent from the following description and the referenced drawings.

Figure 1:
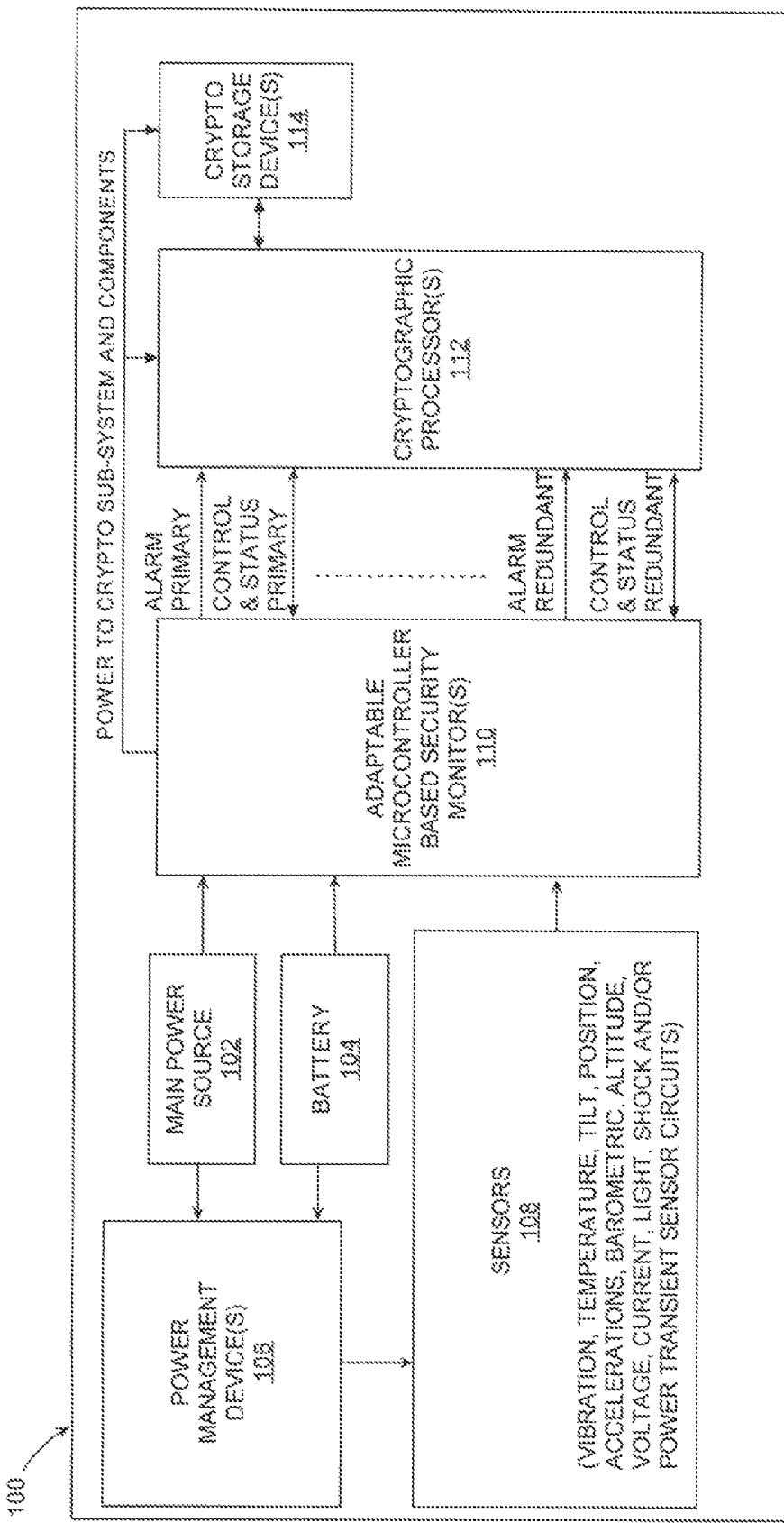
FIG. 1 is a block diagram of a circuit configured for use in cryptographic applications that is useful for understanding the present invention.

Referring now to FIG. 1, there is provided a block diagram of a circuit 100 configured for use in cryptographic applications. As shown in FIG. 1, the circuit 100 is comprised of a main power source 102, a battery 104, a power management device 106, sensors 108, an adaptable microcontroller based security monitor ("security monitor") 110, a cryptographic processor 112 and a cryptographic storage device 114. Each of the listed components 102-108, 112-114 is well known to persons skilled in the art, and therefore will not be described in great detail herein. However, a brief discussion of the circuit 100 is provided to assist a reader in understanding the present invention.

Referring again to FIG. 1, the security monitor 110 is provided to protect the cryptographic device 112, 114 from (1) tampering and (2) environmental factors that could adversely affect performance. The term "tampering" as used herein refers to unauthorized efforts intended to (a) retrieve data stored in a cryptographic devices 112, 114 and/or (b) compromise a cryptographic device 112, 114. The term "physical security" as used herein refers to a hardware and/or software implementation that will adaptively monitor and/or protect against such tampering. The term "environmental security" refers to a hardware implementation that will adaptively reduce a circuit's susceptibility to environmental factors such as temperature extremes, noise, vibrations, or the like. The environmental security is based on an operational profile of the security monitor 110.

The phrase "operational profile" as used herein refers to sensor profiles and power source profiles. Such profiles can include, but are not limited to, a physical security sensor profile, a vibration sensor profile, a temperature sensor profile and a hold up battery profile. Each profile can include a threshold value, a pre-defined range of operational profile values, information indicating how often to obtain sensor parameter values from a particular sensor, and/or information indicating how many cycles of an adaptive security process are to be performed during a defined period of time. The adaptive security process will be described in detail below in relation to FIG. 3.

Referring again to FIG. 1, the security monitor 110 is configured to monitor conditions occurring from a physically invasive act, such as the act of opening a casing (not shown), the act of breaking a circuit or the act of forming unauthorized electrical connections to a circuit. Such conditions include, but are not limited to, changes in voltage, changes in temperature, changes in sound, changes in ambient light, changes in acceleration and changes in vibration. Such conditions are limited to the number and type of sensors available in any given embodiment. In this regard, it should be appreciated that the security monitor 110 is a programmable circuit, and therefore is more flexible/adaptable than conventional tamper circuits comprising a relatively large number of discrete components. This flexibility/adaptability feature of the security monitor 100 will become more evident as the discussion progresses. The security monitor 110 will be described in greater detail below in relation to FIG. 2.

Figure 2:
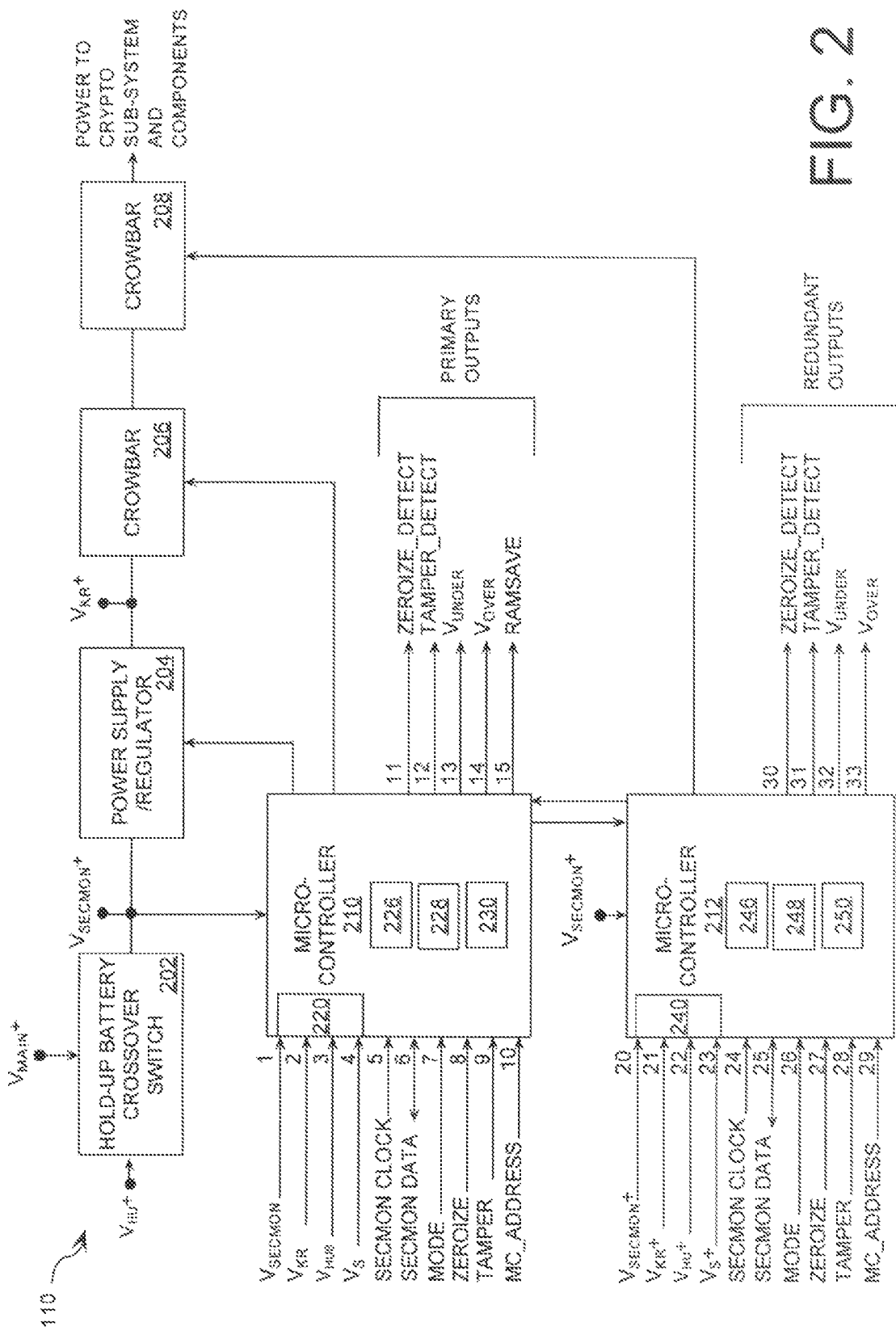
FIG. 2 is a block diagram of an adaptable microcontroller based security monitor of FIG. 1 that is useful for understanding the present invention.

Referring now to FIG. 2, there is provided a block diagram of the security monitor 110 of FIG. 1. As shown in FIG. 2, the security monitor 110 is comprised of a hold up battery (HUB) crossover switch 202, a power supply/regulator 204, crowbars 208, 208 and a plurality of microcontrollers 210, 212. It should be appreciated that the security monitor 110 is one exemplary embodiment of a security monitor. The invention is not limited in this regard. For example, the security monitor 110 can be comprised of N microcontrollers 210, 212, where N is an integer. As should be understood, the number of microcontrollers can be selected in accordance with a particular security monitor 110 application. More particularly, the security monitor 110 can be designed for use on any given platform with a relatively small amount of hardware changes. The term "platform" as used herein refers to a framework, either in hardware or software, which allows software to run.

It should also be appreciated that such a multi-microcontroller configuration advantageously provides a security monitor 110 having a redundancy feature. The redundancy feature allows for reliable operation, decreased processing time and satisfaction of customer requirements for high assurance tamper protection. It should further be appreciated that each of the above listed components is well known to persons skilled in the art, and therefore will not be described in great detail herein. However, a discussion of the security monitor 110 is provided to assist a reader in understanding the present invention.

Referring again to FIG. 2, the HUB crossover switch 202 can be a supervision relay configured to open and close at least one switch under the control of another circuit. More specifically, the HUB crossover switch 202 can be configured to open or close at least one switch when a main power source parameter falls below a threshold value. For example, the HUB crossover switch 202 includes two (2) input ports. A first input port is electronically coupled to a main power source 102. The main power source 102 is typically provided for powering the security monitor 110 during its normal operation. A second input pod is electronically coupled to a hold up battery 104. The hold up battery 104 is provided for powering the security monitor 110 when the main power source 102 is in a discharge state, and/or the main power source 102 is temporarily removed so that it can be replaced. If a voltage at the first input pod exceeds a threshold value, then a first switch is closed so that the microcontrollers 210, 212 and/or other components are powered by the main power source 102. Alternatively, if a voltage at the first input port falls below a threshold value, then the first switch is opened and a second switch is closed so that the microcontrollers 210, 212 and/or other components are powered by the hold up battery 104. Still, the invention is not limited in this regard.

The power supply/regulator 204 can be a low drop out regulator configured to regulate an input voltage and maintain a constant output voltage. The power supply/regulator 204 can be provided to ensure that a voltage input does not exceed a maximum voltage that is within a safe operating capability of the microcontrollers 210, 212 and other circuitry. The crowbars 208, 208 can be provided to disconnect power supplied to the cryptographic processors) 112 and the cryptographic storage device(s) 114. The crowbars 208, 208 can also be provided for shorting the power supplied to external security sensitive devices to ground for enabling passive zeroization. The term "zeroization" as used herein refers to actions taken in situations where it is desirable to erase sensitive information from one or more storage devices. It should be noted that the power for external security sensitive devices does not need to be provided to and/or from the power supply/regulator 204. Still, the invention is not limited in this regard.

The microcontrollers 210, 212 can be an ultra-low power microcontroller. Such an ultra-low power microcontroller can have a model number MSP430, which is available from Texas instruments of Dallas, Tex. Such a microcontroller has a device locking feature. This device locking feature provides a user with the ability to configure the device such that others are prevented from reading information from storage circuits contained therein. Still, the invention is not limited in this regard. The microcontrollers 210, 212 can be any microcontroller known in the art provided that it is suitable for low power, high performance applications.

As shown in FIG. 2, each of the microcontrollers 210, 212 is comprised of a plurality of input terminals 1-10, 20-29 and a plurality of output terminals 11-15, 30-33. According to an embodiment of the invention, the input terminals include a $V_{SECMON}$ terminal 1, 20, a $V_{KR}$ terminal 2, 21, a $V_{HUB}$ terminal 3, 22, a $V_S$ terminal 4, 23, a SECMON CLOCK terminal 5, 24, a SECMON DATA terminal 6, 25, a MODE terminal 7, 26, a ZEROIZE terminal 8, 27, a TAMPER terminal 9, 28 and a MC_ADDRESS terminal 10, 29. The output terminals include a ZEROIZE_DETECT terminal 11, 30, a TAMPER_DETECT terminal 12, 31, a $V_{UNDER}$ terminal 13, 32, a $V_{OVER}$ terminal 14, 33. and a RAMSAVE terminal 15. Still, the invention is not limited in this regard.

Referring again to FIG. 2, the $V_{SECMON}$ terminal 1, 20 is a unidirectional input terminal used in situations where it is desirable to monitor the voltage supplied by a main power source 102. Similarly, the $V_{KR}$ terminal 2, 21 is a unidirectional input terminal used in situations where it is desirable to monitor the output voltage of the power supply/regulator 204. Likewise, the $V_{HUB}$ terminal 3, 22 is a unidirectional input terminal used in situations where it is desirable to monitor the voltage supplied by a hold up battery 104. The $V_S$ terminal 4, 23 is a unidirectional input terminal used in situations where it is desirable to monitor changes in the voltage supplied by a main power supply 102, a hold up battery 104 and/or other power source.

Referring again to FIG. 2, the SECMON DATA terminal 6, 25 is a serial address and data input/output terminal. In this regard, it should be appreciated that the SECMON DATA terminal 6, 25 is a bidirectional terminal used to: (a) transfer address and data into a microcontroller 210, 212; and (b) transfer data out of a microcontroller 210, 212. In this regard, it should be appreciated that the cryptographic processor 112 can be electronically connected to the microcontrollers 210, 212 via the SECMON DATA terminals 6, 25. In such a scenario, the cryptographic processor 112 can utilize the SECMON DATA terminals 6, 25 for communicating control signals and/or status requests to the microcontrollers 210, 212. Each microcontroller 210, 212 can have a common or separate interface for enabling communications with the cryptographic processor 112. The interface can be selected in accordance with a level of security requirement. It should also be appreciated that the microcontrollers 210, 212 can be electronically connected to each other via the SECMON DATA terminals 6, 25. In such a scenario, each microcontroller 210, 212 can utilize the SECMON DATA terminals 6, 25 for communicating information to another microcontroller or receiving information from another microcontroller.

The SECMON CLOCK terminal 5, 24 is a serial clock input terminal. In this regard, it should be understood that the SECMON CLOCK terminal 5, 24 is a unidirectional terminal used to synchronize the data transfer from and to the microcontrollers 210, 212. According to an embodiment of the invention, I²C ports of the microcontroller 210, 212 are used for the SECMON DATA terminals 6, 25 and the SECMON CLOCK terminals 5, 24. I²C ports are well known to persons skilled in the art, and therefore will not be described in great detail herein. Still, the invention is not limited in this regard.

The MODE terminal 7, 26 is a unidirectional input terminal used to change the operating mode of a microcontroller 210, 212 and/or an operational profile for the microcontroller 210, 212. Such operating modes may include, but are not limited to, a power down mode, a standby mode, a plain text mode, a cipher text mode, a key fill mode and an operational profile selection mode. Still, the invention is not limited in this regard.

The ZEROIZE terminal 8, 27 is a unidirectional input terminal used in situations where it is desirable to erase sensitive information from infernal memory. Such situations include, but are not limited to, a situation where a system has been compromised, a situation where a hold up battery is low on power, and a situation where a microprocessor is non-responsive or operating improperly. The phrase "sensitive information" as used herein refers to cryptographic key information, system descrambling information, system timing information and the like. The phrase "cryptographic key information" as used herein refers to information that controls an operation of a cryptographic algorithm.

The TAMPER terminal 9, 28 is a unidirectional input terminal used in a situation where it is desirable to defect when data has been modified. The MC_ADDRESS terminal 10, 29 is a unidirectional input terminal used in situations where it is desirable to address individual microcontrollers 102, 104 when sharing a common communications bus, such as the SECMON CLOCK bus (not shown) and a SECMON DATA bus (not shown). The MC_ADDRESS terminal 10, 29 may also be used in situations where it is desirable to use the MC_ADDRESS as a unique identifier in control/status responses and/or to use the MC_ADDRESS in a microcontroller algorithm. Still, the invention is not limited in this regard.

The ZEROIZE_DETECT terminal 11, 30 is a unidirectional output terminal used in situations where it is desirable to inform a cryptographic device 112, 114 that it needs to perform an action for erasing sensitive information from memory while in an active state. The phrase "active state" as used herein refers to a state when power is provided to the security monitor 110. Such situations include, but are not limited to, a situation where a system has been compromised, a situation where a hold up battery is low on power, and a situation where a microprocessor is non-responsive or operating improperly.

The TAMPER_DETECT terminal 12, 31 is a unidirectional output terminal used in situations where it is desirable to communicate a signal indicating that a tamper event has occurred to an external cryptographic device 112, 114. The signal is generated to indicate that a microcontroller 210, 212 has detected an unauthorized action to either the circuit 100 and/or data.

The $V_{UNDER}$ terminal 13, 32 is a unidirectional output terminal used in situations where it is desirable to communicate an under voltage signal to an external device (not shown). The under voltage signal is generated to indicate that a microcontroller 210, 212 has defected an under voltage condition at a voltage input of a power supply. The $V_{OVER}$ terminal 14, 33 is a unidirectional output terminal used in situations where it is desirable to communicate an over voltage signal to an external device (not shown). The over voltage signal is generated to indicate that a microcontroller 210, 212 has detected an over voltage condition at a voltage input of a power supply.

The RAMSAVE terminal 15 is a unidirectional output terminal from a microcontroller 210, 212 to an external device (not shown) for indicating that system power is low and memory writes are prevented. In this regard, it should be appreciated that each microcontroller 210, 212 is comprised of a RAMSAVE function. The RAMSAVE function is well known to persons skilled in the art, and therefore will not be described in great detail herein. However, it should be appreciated that the RAMSAVE function provides a means for external devices to be notified that memory writes are prevented to protect corruption of memory during times of low system power.

Each of the microcontrollers 210, 212 can be comprised of analog comparators 228, 248. The analog comparators 228, 248 can be used for detecting transient changes in power supplied to the microcontrollers 210, 212. Each of the microcontrollers 210, 212 can also be comprised of an analog to digital (A/D) conversion circuit 220, 240. The A/D conversion circuits 220, 240 can be used in situations where it is desirable to monitor changes in the voltage supplied by a main power source, a hold up battery and/or other power source. Each microcontroller 210, 212 can also be comprised of a temperature sensor circuit 226, 246. The temperature sensor circuit 226, 246 can be used in situations where it is desirable to monitor changes in a temperature of an environment surrounding the circuit 100. It should be noted that the microcontrollers 210, 212 can further be configured to monitor sound and/or ambient light of an environment surrounding the circuit 100. In such a scenario, the microcontrollers 210, 212 can be electronically coupled to at least one external environmental sensor 108, such as a sensor configured for detecting sound, a photo sensor configured for defecting light and the like.

Each of the microcontrollers 210, 212 is comprised of a memory circuit 230, 250. The memory circuit 230, 250 can be a static random access memory (SRAM) or any other suitable memory known in the art. Such a memory configuration advantageously provides a means for storing sensitive information in: (a) a distributed fashion; (b) an easily accessible internal location so that it can be directly deleted by the microcontrollers 210, 212 when a circuit has been compromised; and/or (c) in a securely locked environment where others are prevented from reading information from storage circuits contained therein.

For example, each of the microcontrollers 210, 212 has a device locking feature that provides a user with the ability to configure the device such that others are prevented from reading information from storage circuits contained therein. Each of the memory circuits 230, 250 internal to the microcontrollers 210, 212 is configured to store at least a portion of an encrypted cryptographic key. It should be noted that this distributed key storage configuration provides a system with a higher assurance security feature as compared to conventional cryptographic systems. The phrase "cryptographic key" as used herein refers to information that controls an operation of a cryptographic algorithm. Still, the invention is not limited in this regard.

Referring again to FIG. 2, the microcontrollers 210, 212 are advantageously configured to cross check at least one other microcontroller. For example, the microcontroller 212 can communicate with the microcontroller 210 to: (a) compare test parameters (such as, voltage, temperature, ambient light and sound); and/or (b) determine whether the microcontroller 210 is non-responsive or operating improperly. If it is determined that the microcontroller 210 is non-responsive or operating improperly, then the system is deemed to have been compromised or a silent failure has occurred with the non-responsive microcontroller 210. In effect, the microcontroller 212 can perform actions to; (a) notify a user that a microcontroller is non-responsive or operating improperly; and/or (b) erase sensitive information from volatile circuits in an active state. Still, the invention is not limited in this regard.

The microcontrollers 210, 212 can also perform actions to monitor a hold up battery life and then adjust its operation based upon an assessment of the hold up battery life. For example, if a microcontroller 210, 212 determines that the hold up battery 104 is low on power, then the microcontroller 210, 212 performs actions to: (a) indicate to a user that the hold up battery 104 needs to be replaced; and/or (b) reduce a number of times sampling is performed in a defined period of time to extend battery life until it can be replaced by a user. Further, when a measured parameter value suggests that the battery 104 is low on power or conditions otherwise suggest the need to prolong battery life, one of the microcontrollers 210, 212 can be temporarily disabled (at the expense of losing high assurance mode of operation) or its operational profile modified in a way that reduces power consumption.

This hold up battery monitoring feature is advantageous in cryptographic applications. In this regard, it should be appreciated that certain cryptographic information is stored in volatile memory. Such volatile memory includes, but is not limited to, volatile random access memory (RAM) that will lose any data stored therein if power to the same is interrupted for any reason. The hold up battery 104 provides a means for powering volatile memory and certain other types of internal components when the main power source 102 is in a discharge state, and/or a main power source 102 is temporarily disconnected from the circuit 100. As such, the hold up battery life monitoring feature advantageously provides a means for: (a) ensuring that a hold up battery 104 is always available for powering volatile memory; and/or (b) erasing the volatile memory in an active state.

The microcontrollers 210, 212 can further perform an adaptive security process. In this regard, it should be understood that the microcontrollers 210, 212 can: (a) monitor one or more parameters to determine whether physical tampering or environmental tampering of a system or circuit has occurred; and (b) adjust its operation based upon an assessment of at least one parameter. The parameters can include, but are not limited to, a voltage or power source parameter, a vibration sensor parameter, a light sensor parameter, a temperature sensor parameter, an acceleration sensor parameter and a sound sensor parameter. Suitable sensors for measuring such parameters are well known in the art. The adjustment or modification to the operation of the device can include selectively varying one or more profile values that are used to evaluate the presence or absence of security threats. In this regard, it should be appreciated that the profile values can be stored in a dynamic operation profile database located in each microcontroller 210, 212 embedded memory 230, 250. In this regard, it should be appreciated that the storing of the dynamic operation profile database within embedded memory 230, 250 provides a means for additional protection of the data. As such, the microcontrollers 210, 212 can access the embedded memory 230, 250 and perform actions to selectively vary the profile values stored therein. Alternatively, such adjustments can include varying a data sampling rate and/or temporarily limiting sensing/evaluation steps associated with certain parameters. In this regard, it should be appreciated that the data associated with the sampling rate and number of times to perform a sensing/evaluation step can be stored in the dynamic operation profile database located within each microcontroller 210, 212 embedded memory 230, 250. As such, the microcontrollers can access the embedded memory 230, 250 and perform actions to vary such data. The adaptive security process will be described in greater detail below in relation to FIG. 3.

Figure 3:
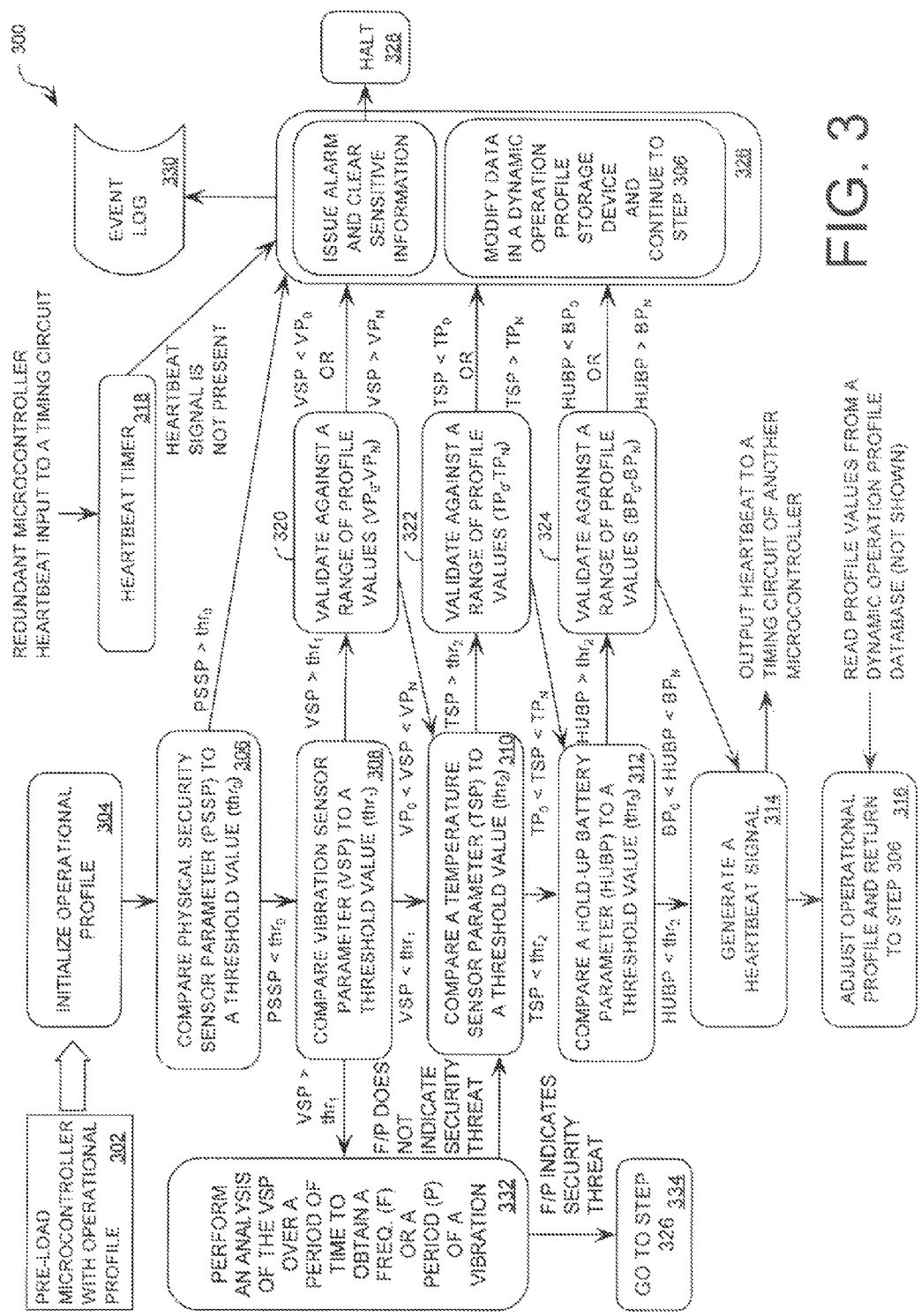
FIG. 3 is a conceptual diagram of an adaptive security process performed by a microcontroller of FIG. 2 that is useful for understanding the present invention.

Referring now to FIG. 3, there is provided a conceptual diagram of an adaptive security process 300 performed by a microcontroller 210, 212 (described above in relation to FIG. 2). As shown in FIG. 3, the adaptive security process 300 generally involves determining when tampering has occurred or when environmental factors exist that may adversely affect the security or other operations of the cryptographic processor. This process includes performing an assessment of one or more parameters defined by an operational profile. The parameters can include without limitation a power source parameter, a temperature sensor parameter, a sound sensor parameter, a light sensor parameter, an acceleration sensor parameter or a vibration sensor parameter. The assessment comprises determining whether a parameter has a value exceeding a threshold value and/or existing outside a range of operational profile values.

The adaptive security process 300 also generally involves performing one or more protection actions if it is determined that a parameter has a value exceeding the threshold value and/or existing outside the range of operational profile values. The protection actions can include: (a) an action for issuing an alarm; (b) an action for halting execution of one or more applications or processes; (c) an action for erasing sensitive information from a storage circuit; and/or (d) an action for modifying the operational profile data stored in a dynamic operation profile database within each microcontroller 210, 212 embedded memory 230, 250. It should be understood that modification of the operational profile includes modifying one or more values of operational parameters of the microcontroller.

In order to more fully understand the present invention, it is helpful to consider the circumstances under which it is desirable for an security process to provide an adaptive response to sensor indications of tampering or adverse environmental conditions. In a first scenario involving an excessively high temperature, a temperature sensor parameter value exceeds a threshold value. This can trigger an evaluation of the temperature sensor parameter value. For example, the evaluation can be used to determine whether the temperature sensor parameter value fails above a range of operational profile values. If so, the environment external to the security monitor 110 can be deemed to be a high temperature environment in which a hold-up battery life is decreased. Consequently, it can be advantageous to modify a cycle data value associated with an operational profile for extending a hold-up battery life in such a high temperature environment. The cycle data value can define how often to obtain sensor parameter values during the adaptive security process 300. More particularly, the cycle data includes information for reducing a number of times sampling is performed in a defined period of time. Still, the invention is not limited in this regard.

In a second scenario involving an excessively low temperature, a temperature sensor parameter value exceeds a threshold value. This can triggers an evaluation of the temperature sensor parameter value. For example the evaluation can determine whether the temperature sensor parameter value falls below a predefined range of operational profile values. If so, the environment external to the security monitor 110 can be deemed to be a low temperature environment in which an output power of the hold-up battery life is decreased. Consequently, it can be advantageous to modify a cycle data value for adjusting the operation of the microcontroller in accordance with the amount of power provided to the microcontroller by the hold-up battery in the low temperature environment. The cycle data includes information indicating how often to obtain sensor parameter values during the adaptive security process 300. More particularly, the cycle data includes information for reducing a number of times sampling is performed in a defined period of time. Still, the invention is not limited in this regard.

In a third scenario involving excessive vibration, a vibration sensor parameter value exceeds a threshold value. This can trigger an evaluation of the vibration sensor parameter value to determine whether the vibration sensor parameter value falls outside a range of operational profile values. According to one embodiment the evaluation of the vibration sensor parameter can include a determination as to whether the vibration sensor parameter value falls outside a predefined operational range. According to a further embodiment, the evaluation can include an analysis of the vibration sensor parameter over some period of time to determine one or more characteristics of the vibration. For example, the one or more characteristics can include a frequency of the vibration and how often the vibration is occurring (the period of the vibration). This information can be useful for determining the source of the vibration.

It will be appreciated that some vibrations may indicate an attempt at tampering and may therefore constitute a security threat. Other vibrations may be expected as pad of the normal environment to which a piece of equipment is subjected. For example, an intense periodic vibration at a particular frequency can be interpreted as a normal condition associated with a weapon firing. In that case, the environment external to the security monitor 110 is deemed to have been changed from a static or transport environment (having a relatively low vibration characteristic) to a combat environment, in the transport environment, the vibration sensors detect relatively weak shocks occurring randomly. In the combat environment, the vibration sensors detect relatively intense vibrations occurring at a particular frequency at some interval or period.

In the combat environment, it may be desirable to modify an operating profile so that the vibrations thus caused do not result in a security related action. For example, it would not be desirable to delete cryptographic data or halt a cryptographic program under such circumstances.

In a fourth scenario involving excessive vibration, a vibration sensor parameter value exceeds a threshold value. This can trigger an evaluation of the vibration sensor parameter value to determine whether the vibration sensor parameter value falls outside a range of operational profile values. During this evaluation, it is determined that the vibration sensor parameter does not fall outside of the range of operational profile values. Slated differently, the vibration sensor parameter value is not high enough to trigger one or more security related actions, such as the deletion of cryptographic data or halting the execution of a cryptographic program. Still, such vibration can suggest that the presence of a potential security threat. For example, an attempt may be in progress to physically access cryptographic circuits contained in an enclosure within the equipment. The potential presence of such security threat can justify the implementation of an operational profile with modified operational profile values for other sensor parameters. For example, if a vibration sensor parameter value suggests the presence of a potential threat, it can be desirable to reduce an acceptable range of electrical noise or voltage fluctuation as defined by an operational profile. Similarly, it can be desirable to modify an acceptable range of values for ambient light exposure defected by a sensor. Stated differently, it can be said that the operational profile values for the sensors are adaptive.

The adaptive security process 300 will now be described in greater detail. As shown in FIG. 3, the adaptive security process 300 begins with step 302. In step 302, actions are performed to pre-load a microcontroller with an operational profile. The term "load" as used herein means to copy data from a first storage medium, such as a disk, to a second memory infernal to a microprocessor. As should be understood, operational profile information needs to be loaded before it can be accessed and used by a program installed on the microcontroller. The operational profile includes, but is not limited to, threshold values, ranges of operational profile values and other data for controlling the operation of the microcontroller. The operational profile can include pre-determined ranges of acceptable values for parameters, a list or other indication of parameter values that will actually be evaluated, and some variable to indicate a rate at which the parameter values are evaluated. Such data can include information indicating how often to cycle through the steps 304-318 (described below) during the adaptive security process 300. As explained below, the data can also specify certain steps which are bypassed or otherwise not performed for purposes in some instances.

Thereafter, the adaptive security process 300 continues with step 304. In step 304, actions are performed to initialize an operational profile. The operational profile initialization is performed so as to collect information regarding a physical security sensor profile, a vibration sensor profile, a temperature sensor profile, a hold up battery profile and other such profiles. The operational profile initialization is also performed so as to collect information indicating the predetermined ranges of acceptable values for parameters, a list or other indication of parameter values that will actually be evaluated, and some variable to indicate a rate at which the parameter values are evaluated, i.e. the number of times sensor parameter values are obtained from one or more sensors in a defined period of time. The operational profile initialization is used to collect profile data during the execution of a program implementing the adaptive security process 300 and installed on the microcontroller.

After step 304, the adaptive security process 300 continues with step 306. In step 308, a physical security sensor parameter (PSSP) value is compared to a threshold value $thr_0$. As should be understood the PSSP value can be a voltage value obtained from a physical security sensor. The PSSP sensor can be any type of sensor that is suitable for detecting an occurrence of a physical intrusion within a secured area of a piece of communication or processing equipment. Those skilled in the art will appreciate that the precise arrangement of the PSSP will vary depending upon the particular application. If the PSSP value is greater than the value $thr_0$, then step 326 is performed where an alarm is issued and/or sensitive information is erased from at least one storage circuit. Subsequent to step 326, the adaptive security process 300 may continue with optional steps 328 and 330. In optional step 328, one or more application programs or processes associated with a cryptographic processor can be halted. In optional step 330, an event log is updated. If the PSSP value does not exceed the value $thr_0$, then step 308 is performed.

In step 308, a vibration sensor parameter (VSP) value is compared to a threshold value $thr_1$. If the VSP value is greater than the value $thr_1$, then the adaptive security process 300 continues with step 320 and/or step 332. In step 320, the VSP value is validated by comparing it against a pre-defined range of vibration sensor profile values $VP_0, \ldots, VP_N$. This comparison process is performed to determine whether the VSP value fails within the range of vibration sensor profile values $VP_0, \ldots, VP_N$. If the VSP value does fail within the range of vibration sensor profile values $VP_0, \ldots, VP_N$, then the adaptive security process 300 continues with step 310. If the VSP value does not fall within the range of vibration sensor profile values $VP_0, \ldots, VP_N$, then the adaptive security process 300 continues with step 326 where actions are performed to: (a) issue an alarm; (b) erase sensitive information from at least one storage circuit; and/or (c) modify data stored in a dynamic operation profile database within each microcontroller 210, 212 embedded memory 230, 250. If a data modification action is performed, then the adaptive security process 300 also involves actions for continuing to a next step 310. After step 326, the adaptive security process 300 may continue with optional steps 328 and 330. In optional step 328, one or more application programs or processes associated with a cryptographic processor can be halted. In optional step 330, an event log is updated.

In step 332, an analysis is performed of the VSP over a period of time to obtain a frequency or a period of vibration. This analysis can involve determining whether the frequency and/or period of vibration indicate a security threat. If the frequency and/or period of vibration indicate a security threat, then the adaptive security process 300 continues with step 326. If the frequency or period of vibration does not indicate a security threat, then the adaptive security process 300 continues with step 310.

In step 310, a temperature sensor parameter (TSP) value is compared to a threshold value $thr_2$. If the TSP value does not exceed the value $thr_2$, then step 312 is performed, if the TSP value is greater than the value $thr_2$, then the adaptive security process 300 continues with step 322. In step 322, the TSP value is validated by comparing it against a pre-defined range of temperature sensor profile values $TP_0, \ldots, TP_N$. This comparison process is performed to determine whether the TSP value fails within the range of temperature sensor profile values $TP_0, \ldots, TP_N$. If the TSP value does fall within the range of temperature sensor profile values $TP_0, \ldots, TP_N$, then the adaptive security process 300 continues with step 312. If the TSP value does not fall within the range of temperature sensor profile values $TP_0, \ldots, TP_N$, then the adaptive security process 300 continues with step 326 where actions are performed to: (a) issue an alarm; (b) erase sensitive information from at least one storage circuit; and/or (c) modify data stored in a dynamic operation profile database within each microcontroller 210, 212 embedded memory 230, 250. If a data modification action is performed, then the adaptive security process 300 also involves actions for continuing to a next step 312. After step 326, the adaptive security process 300 may continue with optional steps 328 and 330. In optional step 328, one or more application programs or processes associated with a cryptographic processor can be halted. In optional step 330, an event log is updated.

In step 312, a hold-up battery parameter (HUBP) value is compared to a threshold value $thr_3$. If the HUBP value does not exceed the value $thr_3$, then step 314 is performed. If the HUBP value is greater than the value $thr_3$, then the adaptive security process 300 continues with step 324. In step 324, the HUBP value is validated by comparing it against a pre-defined range of hold-up battery profile values $BP_0, \ldots, BP_N$. This comparison process is performed to determine whether the HUBP value falls within the range of hold-up battery profile values $BP_0, \ldots, BP_N$. If the HUBP value does fall within the range of hold-up battery profile values $BP_0, \ldots, BP_N$, then the adaptive security process 300 continues with step 314. If the HUBP value does not fall within the range of hold-up battery profile values $BP_0, \ldots, BP_N$, then the adaptive security process 300 continues with step 326 where actions are performed to: (a) issue an alarm; (b) erase sensitive information from at least one storage circuit; and/or (c) modify data stored in a dynamic operation profile database within each microcontroller 210, 212 embedded memory 230, 250. If a data modification action is performed, then the adaptive security process 300 also involves actions for continuing to a next step 314. After step 320, the adaptive security process 300 may continue with steps 328 and 330. In step 328, the program installed on the microcontroller is halted. In step 330, an event log is updated.

In step 314, a heartbeat signal is generated. According to an embodiment of the invention, the heartbeat signal is a signal that is used to communicate that the microcontroller is active and functioning properly. The heartbeat signal is communicated to a timing circuit of another microcontroller which verifies that the heartbeat signal is present. For example, the second microcontroller can function as a back-up or redundant system for also protecting the cryptographic system against tampering. The presence of the heartbeat signal is provided for indicating that a microcontroller is responsive and/or operating properly. Alternatively, the absence of the heartbeat signal can indicate that a microcontroller is non-responsive and/or operating improperly. Still, the invention is not limited in this regard.

Referring again to FIG. 3, the adaptive security process 300 further involves receiving a heartbeat signal generated by another microcontroller. Thereafter, the adaptive security process 300 involves performing step 318. In step 318, it is determined whether the redundant microcontroller is non-responsive or operating improperly. If the redundant microcontroller is deemed to be non-responsive or operating improperly, then the adaptive security process 300 continues with step 326. In step 326, actions are performed to: (a) issue an alarm; (b) erase sensitive information from at least one storage circuit; and/or (c) modify data stored in a dynamic operation profile database within each microcontroller 210, 212 embedded memory 230, 250. Alternatively, if redundant microcontroller is deemed to be responsive and/or operating properly, then the adaptive security process 300 does not continue with step 326.

Referring again to FIG. 3, the adaptive security process 300 continues with step 316 after completing a step 312, 324, or 326. In step 316, the operational profile is adjusted. This step generally involves reading profile values from a dynamic operation profile database within each microcontroller 210, 212 embedded memory 230, 250. After step 316, the adaptive security process 300 returns to step 306.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without, departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for protecting embedded cryptographic processing circuits, software and data, contained within an electronic equipment, comprising:
monitoring with a first processing device embedded in said electronic equipment a plurality of parameter values generated by a plurality of sensors provided in said electronic equipment in accordance with a base operating profile;
evaluating with said first processing device each of said plurality of parameter values to determine if it falls within a respective one of a plurality of predetermined ranges of acceptable values in accordance with said base operating profile;
automatically using a modified operating profile in said first processing device in place of said base operating profile to perform said monitoring or evaluating step if one or more of said parameter values is determined in said evaluating step not to be within said respective predetermined range; and
selecting said modified operating profile to include one or more defined variables which are different as compared to defined variables of said base operating profile, said defined variables selected from a group consisting of said plurality of predetermined ranges of acceptable values, the parameter values that are evaluated, and a rate at which said parameter values are evaluated.

2. The method according to claim 1, further comprising responsive to said evaluating step, performing at least one action to prevent confidential information associated with said cryptographic processing circuits, software or data from unauthorized disclosure.

3. The method according to claim 2, further comprising selecting said at least one action from the group consisting of deleting a cryptographic key data from a memory location, halting an execution of a cryptographic software, and deleting a cryptographic software from a memory location.

4. The method according to claim 1, further comprising selecting said modified operating profile to prolong a duration of a battery life.

5. The method according to claim 4, further comprising selecting said modified operating profile to cause a reduced rate at which said plurality of parameter values are evaluated by said processing device in order to reduce consumption of power provided by a battery.

6. The method according to claim 4, further comprising selecting said modified operating profile to cause a reduction in a number of said plurality of parameter values that are evaluated by said processing device in order to reduce consumption of power provided by a battery.

7. The method according to claim 1, further comprising selecting said first processing device from the group consisting of a microprocessor, a microcontroller or a digital signal processor.

8. The method according to claim 7, further comprising performing said monitoring and said evaluating steps in at least a second data processing device concurrently with said monitoring and evaluating steps in said first data processing device, said second data processing device providing redundancy for the first data processing device.

9. The method according to claim 8, further comprising monitoring an operational status of said first data processing device with said second data processing device.

10. The method according to claim 9, further comprising monitoring an operational status of said second data processing device with said first data processing device.

11. The method according to claim 8, further comprising performing at least one action to prevent unauthorized disclosure of confidential information associated with said cryptographic processing circuits, software or data if said operational status indicates a failure of said second data processing device.

12. The method according to claim 1, further comprising selecting said plurality of sensors from the group consisting of a physical intrusion sensor, a temperature sensor, a vibration sensor, and a light sensor.

13. The method according to claim 1, further comprising selecting said modified operating profile to include a more limited range for at least one predetermined range of acceptable values if at least one said parameter value is within said predetermined ranges of acceptable values but outside a nominal range normally expected for said parameter value.

14. A method for protecting embedded cryptographic processing circuits, software and data, contained within an electronic equipment, comprising:
configuring a plurality of sensors to detect a plurality of security and environmental conditions associated with a cryptographic processing circuit;
monitoring with a first processing device embedded in said electronic equipment a plurality of parameter values generated by said plurality of sensors;
evaluating with said processing device each of said plurality of parameter values to determine if it falls within a respective one of a plurality of predetermined ranges of acceptable values; and
selecting said first processing device from a group consisting of a microprocessor and a microcontroller, and automatically adaptively modifying at least one of said monitoring and evaluating steps in response to at least one parameter value wherein said modifying prolongs a duration of a battery life of said electronic equipment.

15. The method according to claim 14, further comprising responsive to said evaluating step, performing at least one action to prevent confidential information associated with said cryptographic processing circuits, software or data from unauthorized disclosure.

16. The method according to claim 15, further comprising selecting said at least one action from the group consisting of deleting a cryptographic key data from a memory location, halting an execution of a cryptographic software, and deleting a cryptographic software from a memory location.

17. The method according to claim 14, wherein said monitoring and evaluating steps are performed in accordance with a base operating profile and further comprising using a modified operating profile in said first processing device in place of said base profile to perform said monitoring or evaluating step if one or more of said parameter values is determined in said evaluating step not to be within said respective one of said plurality of predetermined ranges of acceptable values.

18. The method according to claim 17, further comprising selecting said modified operating profile to cause a reduced rate at which said plurality of parameter values are evaluated by said first processing device in order to reduce consumption of power provided by a battery.

19. The method according to claim 17, further comprising selecting said modified operating profile to cause a reduction in a number of said plurality of parameter values that are evaluated by said first processing device in order to reduce consumption of power provided by a battery.

20. The method according to claim 17, further comprising selecting said modified operating profile when an environmental condition is likely to cause a reduction in said battery life.

21. The method according to claim 17, further comprising selecting said modified operating profile when a battery is approaching a discharged state.

22. The method according to claim 14, further comprising performing said monitoring and said evaluating steps in at least a second data processing device concurrently with said monitoring and evaluating steps in said first data processing device, said second data processing device providing redundancy for the first data processing device.

23. The method according to claim 22, further comprising monitoring an operational status of said first data processing device with said second data processing device.

* * * * *